US007009644B1

(12) United States Patent
Sanchez et al.

(10) Patent No.: US 7,009,644 B1
(45) Date of Patent: Mar. 7, 2006

(54) DYNAMIC ANOMALOUS PIXEL DETECTION AND CORRECTION

(75) Inventors: George Sanchez, Fremont, CA (US); Bryed Billerbeck, Mountain View, CA (US); Remy Zimmerman, Belmont, CA (US)

(73) Assignee: Logitech Europe S.A., (CH)

(*) Notice: Subject to any disclaimer, the term of this patent is extended or adjusted under 35 U.S.C. 154(b) by 0 days.

(21) Appl. No.: 09/464,364

(22) Filed: Dec. 15, 1999

(51) Int. Cl.
*H04N 9/64* (2006.01)

(52) U.S. Cl. .................. 348/247; 348/246; 348/243; 348/248

(58) Field of Classification Search ........... 348/246, 348/247, 272, 270, 207.99, 207.1, 243, 245, 348/248, 249, 250; 382/270; 322/272

See application file for complete search history.

(56) References Cited

U.S. PATENT DOCUMENTS

| 4,589,026 A | 5/1986 | Ozawa et al. |
| 4,758,883 A | 7/1988 | Kawahara et al. |
| 4,774,565 A | 9/1988 | Freeman |
| 4,816,663 A | 3/1989 | Utagawa et al. |
| 4,823,201 A | 4/1989 | Simon et al. |
| 4,884,140 A | 11/1989 | Park |
| 4,979,042 A | 12/1990 | Vogel |
| 5,047,861 A | 9/1991 | Houchin et al. |
| 5,060,071 A | 10/1991 | Ino |
| 5,231,485 A | 7/1993 | Israelsen et al. |

(Continued)

FOREIGN PATENT DOCUMENTS

EP 0917358 A1 5/1999

OTHER PUBLICATIONS

"Machine Vision Technique for increasing the integrity of chip alignment data" IBM Technical Disclosure Bulletin, Mar. 1992, vol. 34, issue 10b, pp. 129-131.

(Continued)

*Primary Examiner*—Thai Tran
*Assistant Examiner*—Nelson D. Hernandez
(74) *Attorney, Agent, or Firm*—Townsend and Townsend and Crew, LLP

(57) ABSTRACT

A method and a system for dynamically detecting and correcting anomalous pixels in the raw data taken from an image sensor array such as a CCD or a CMOS sensor array, thus allowing the use of dumb cameras to capture digital images for subsequent use by an intelligent host—such as being displayed on a computer monitor. This invention uses software algorithms running on an intelligent host processor to dynamically correct the anomalous pixels in the raw data taken from an image sensor array typical of those in a digital still or a video camera. Using the combination of a dumb camera which provides raw data to an intelligent host, which does all the subsequent image processing, the system works by scanning an image frame for pixels that vary more than a specified amount in their brightness value from their neighboring pixels and designating those as defective pixels. The location and frequency of the photosites sending the defective pixels are stored in a statistical database in the computer's memory. The brightness value of a defective pixel is then replaced by a local brightness value obtained from the defective pixel's neighboring pixels. The process includes video subsampling, meaning that the defective pixel detection is carried out and repeated at a pre-specified frame rate to ensure optimum detection and correction at a minimal level of scanning. A statistical database is kept so that truly anomalous pixels can over time be distinguished from false detection of true anomalies in the target image, lighting or other environmentally induced anomalies.

11 Claims, 2 Drawing Sheets

U.S. PATENT DOCUMENTS

| | | |
|---|---|---|
| 5,243,447 A | 9/1993 | Bodenkamp et al. |
| 5,280,361 A | 1/1994 | Ishikawa |
| 5,327,246 A | 7/1994 | Suzuki |
| 5,343,302 A | 8/1994 | Yamashita et al. |
| 5,379,070 A | 1/1995 | Retter et al. |
| 5,381,174 A | 1/1995 | de Groot et al. |
| 5,434,902 A | 7/1995 | Bruijns |
| 5,436,659 A | 7/1995 | Vincent |
| 5,475,441 A | 12/1995 | Parulski et al. |
| 5,477,264 A | 12/1995 | Sarbadhikari et al. |
| 5,486,853 A | 1/1996 | Baxter et al. |
| 5,525,957 A | 6/1996 | Tanaka |
| 5,563,405 A | 10/1996 | Woolaway et al. |
| 5,572,208 A | 11/1996 | Wu |
| 5,576,757 A | 11/1996 | Roberts et al. |
| 5,576,797 A | 11/1996 | Kusaka et al. |
| 5,625,413 A | 4/1997 | Katoh et al. |
| 5,646,684 A | 7/1997 | Nishizawa et al. |
| 5,652,582 A | 7/1997 | Truong et al. |
| 5,686,965 A | 11/1997 | Auld |
| 5,694,228 A | 12/1997 | Peirs et al. |
| 5,696,507 A | 12/1997 | Nam |
| 5,712,680 A | 1/1998 | Hieda |
| 5,712,927 A * | 1/1998 | Kim et al. .................. 382/252 |
| 5,748,234 A | 5/1998 | Lippincott |
| 5,784,100 A | 7/1998 | Konishi |
| 5,796,430 A | 8/1998 | Katoh et al. ................ 348/246 |
| 5,805,214 A | 9/1998 | Nishizawa et al. |
| 5,808,672 A | 9/1998 | Wakabayashi et al. |
| 5,815,201 A | 9/1998 | Hashimoto et al. |
| 5,828,986 A | 10/1998 | Horigome et al. |
| 5,841,471 A | 11/1998 | Endsley et al. |
| 5,867,214 A | 2/1999 | Anderson et al. |
| 5,872,965 A | 2/1999 | Petrick |
| 5,903,673 A | 5/1999 | Wang et al. |
| 5,907,359 A | 5/1999 | Watanabe |
| 5,917,549 A | 6/1999 | Simons et al. |
| 5,920,343 A | 7/1999 | Watanabe et al. |
| 5,929,865 A * | 7/1999 | Balz et al. .................. 345/441 |
| 5,982,946 A | 11/1999 | Murakami .................. 382/272 |
| 6,005,613 A | 12/1999 | Endsley et al. |
| 6,035,072 A * | 3/2000 | Read .......................... 382/275 |
| 6,046,769 A | 4/2000 | Ikeda et al. |
| 6,055,066 A | 4/2000 | Kanda |
| 6,111,242 A | 8/2000 | Afghahi |
| 6,157,394 A | 12/2000 | Anderson et al. |
| 6,195,469 B1 | 2/2001 | Nishioka et al. |
| 6,493,025 B1 | 12/2002 | Kiriyama et al. |
| 6,538,691 B1 | 3/2003 | Macy et al. |
| 6,614,477 B1 | 9/2003 | Lee et al. |
| 6,625,318 B1 * | 9/2003 | Tan et al. ................... 382/224 |
| 6,642,960 B1 * | 11/2003 | Kohashi et al. ............. 348/246 |
| 6,665,009 B1 * | 12/2003 | Dong .......................... 348/246 |
| 6,683,643 B1 * | 1/2004 | Takayama et al. .......... 348/247 |
| 6,753,914 B1 * | 6/2004 | Frost .......................... 348/246 |
| 2002/0039139 A1 * | 4/2002 | Hsu et al. ................... 348/222 |

OTHER PUBLICATIONS

Nelson, Mark et al. "The Data Compression Book," M&T Books, Second Edition, Copyright 1993 by Van Nostrand Reinhold, pp. 31-35.

Pennebaker, William B., et al. "JPEG: Still Image Data Compression Standard," Van Nostrand Reinhold, 1996 by M&T Books, pp. 464-467.

Intel Manual, Chapter 1 "Introduction to the Intel Architecture MMX.TM. Technology," Developer's Manual, Copyright Intel Corporation 1996, pp. 1-1 through 1-4.

* cited by examiner

DYNAMIC ANOMALOUS PIXEL DETECTION AND CORRECTION

BACKGROUND OF THE INVENTION

The present invention relates to digital still or video cameras using a solid state image pickup device and more particularly to methods and systems used to detect and correct defective pixels obtained from a solid state image pickup device.

The foundation of digital imaging is the image sensor. Just as in a traditional camera, light enters a digital still or video camera through a lens controlled by a shutter. When the shutter opens, rather than exposing film, the digital camera collects light on an image sensor—a solid state electronic device. Image sensors contain a grid of microscopic photosites or pixels. In a camera, each photosite on the image sensor may represents one pixel of a digitized image. Two types of image sensors that are quite prevalent in the digital imaging field are the charge-coupled device (CCD) and the complimentary metal oxide semiconductor (CMOS) image sensor arrays. These image sensors may contain anywhere from a few hundred to millions of photosites to convert light that is shining on them into small electric currents which can be electronically processed and interpreted and eventually used to recreate and display a target image on a display device.

The processes used to produce these image sensors though highly advanced are not perfect. Photosites in an image sensor array can vary in their sensitivity or ability to convert light into electric currents. Some variation is expected and tolerable, but on occasion, individual photosites in an array can be dead, inactive or over active. This can result in a displayed image having a dark or black dot, bright white dot or incorrect color dot, all of which are unwanted and are undesirable to the end user. Those in the digital imaging field have also recognized the problems caused by improper digitization of target images and have proposed various solutions to detect and correct defective pixels. These prior art methods and systems can be broadly classified into two groups.

On one hand, there are various hardware-based methods for detecting and correcting defective pixels taken from an image sensor array. These hardware-based methods and systems are quite common to video camera manufacturers. Most conventional video cameras using a solid state image pickup device, incorporate a defective pixel detection and correction circuit for correcting defective pixels taken from an image sensor array. The defective pixels are produced when or after the image sensor array is manufactured. In such a camera, a defective pixel correction circuit detects a defective pixel and stores the position data and various data related to the defective pixel in a read only memory (ROM) or the like. Then, when the video camera is in use, pixel data from the defective pixel is replaced by data from a pixel near the defective pixel. One such method and system is disclosed in U.S. Pat. No. 5,796,430. The disadvantage of such approaches is the need to incorporate and program memory devices during product assembly and testing which add costs and delays. Additionally, the hardware device costs will also increase due to the need to add the correcting circuitry or logic to the video processing application specific integrated circuit (ASIC).

On the other hand, there are various software-based methods for detecting and correcting defective pixels in digital images. One such method and system is disclosed in U.S. Pat. No. 5,982,946. Such software-based methods are generally aimed at correcting bad image pixels in an already digitized and fully processed image. These already digitized images are in their final displayable and stored forms which have already been through color processing, compression and various other processing that are performed on the raw data which is read off an image sensor array. Therefore, such software-based methods which treat completely processed digital images, may correct anomalous pixels that are caused by any number of artifacts such as dust or dirt on the original scene, dust or dirt on the lens which was used to capture the scene as well as anomalous pixels in the digitized image which were caused by defective photosites. These methods typically rely on rather sophisticated and expensive systems and computer software to detect and correct bad pixels. These methods generally require user input to detect the location of the potentially bad image pixels. Once the user has visually scanned an entire image and flagged potentially bad image pixels, the system incorporating the software program takes over to correct the flagged defective pixels. Besides requiring user input, such approaches are also expensive, tedious and very time consuming.

The proliferation of inexpensive PC-interfacing digital still and video camera devices requires rapid, dynamic, inexpensive and intelligent defective pixel detection and correction solutions.

SUMMARY OF THE INVENTION

The present invention provides a method and a system for dynamically detecting and correcting anomalous pixels in the raw data taken from an image sensor array such as a CCD or a CMOS sensor array, thus allowing the use of dumb cameras to capture digital images for subsequent use by an intelligent host—such as being displayed on a computer monitor. This invention uses software algorithms running on an intelligent host processor to dynamically correct the anomalous pixels in the raw data taken from an image sensor array typical of those in a digital still or a video camera. The raw image sensor data is the unprocessed brightness data output obtained from the image sensor and which has not gone through any lossy compression or color processing. The image sensor reads analog voltage or current, converts to digital and sends the signal to a host with no further processing or compression. The photosites on the image sensor are used to capture either color or monochrome digital still or video images. The raw image data is sent to the intelligent host over a bus with a data transfer rate which is determined by the bus protocol of the particular bus such as a universal serial bus (USB) or a parallel port. All image processing is moved from the camera to the intelligent host. Using the combination of a dumb camera which provides raw data to an intelligent host, which does all the subsequent image processing, the system works by scanning an image frame for pixels that vary more than a specified amount in their brightness value from their neighboring pixels and designating those as defective pixels. The location and frequency of the photosites sending the defective pixels are stored in a statistical database in the computer's memory. The brightness value of a defective pixel is then replaced by a local brightness value obtained from the defective pixel's neighboring pixels. The process includes video subsampling, meaning that the defective pixel detection is carried out and repeated at a pre-specified frame rate to ensure optimum detection and correction at a minimal level of scanning. A statistical database is kept so that truly anomalous pixels can over time be distinguished from false detection of true anomalies in the target image, lighting or other environmentally induced anomalies.

The software algorithm is intentionally kept very simple so that the processor load and/or the video frame rate is minimally affected. First, the software algorithm is kept simple because it only performs three functions, namely the detection, correction and statistics functions. The statistics routine is kept simple because only position information and frequency of occurrence of anomalous pixels are tracked. Second, the software algorithm is kept simple so as to have a minimal impact on the rate at which data is transferred to the host, so that while a frame is being scanned for defective pixels, subsequent frames are not held up. The maximum impact of the software algorithm is to at worst reduce the video data transfer rate from 10 frames per second (fps) to 9 fps. Third, the software algorithm is kept simple such that the host processor's load is not increased by more 1% when executing the algorithm. The anomalous pixels are detected in one frame and the corrections are later instituted on subsequent frames as they are read off the image sensor.

Dynamic defective pixel detection and correction is important for a number of reasons. First and foremost, image quality can be significantly improved and second, sensor cost can be substantially decreased by increasing the yield or usability of otherwise scrap sensors. Dynamic intelligent host software application based anomalous pixel detection and correction has several additional cost and quality benefits over the traditional hardware-based approaches. First, it reduces manufacturing cost by not having to add and program memory during product assembly and test. Second, it allows for further reductions in cost by not including the correction logic in the video processing ASIC. Finally, it allows for the correction of raw pixel data taken from sensor photosites which may become defective over time and with operating environment changes.

DESCRIPTION OF THE SPECIFIC EMBODIMENTS

Figure 1:
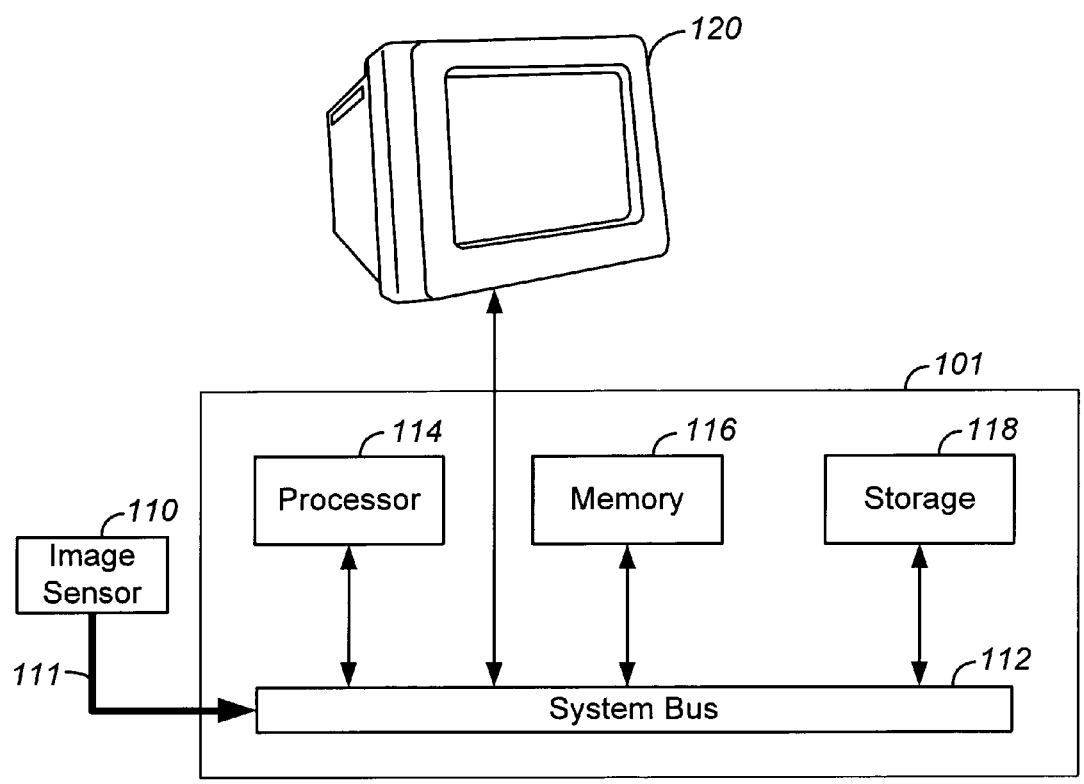
FIG. 1 is a simplified block diagram of a system according to one embodiment of the present invention.

FIG. 1 shows an embodiment of the present invention which uses software algorithms running on an intelligent host processor 114 to dynamically correct defective or anomalous pixels. In one embodiment, the intelligent host is a server or a PC. The system includes an image sensor 110 to capture an image, an intelligent host 101 having a processor 114 to execute the computer program stored in storage 118, and a system bus 112 to facilitate device communications. The image sensor array can either be a charge-coupled device (CCD) or a complimentary metal oxide semiconductor (CMOS) image sensor array, which are typically parts of a video or still digital camera. The image sensor 110 communicates with the host 101 via an external bus 111, which can be a universal serial bus (USB) or a parallel port. Upon transfer of appropriate calls between the processor 114 and the image sensor 110, the computer program is loaded into memory 116.

The system works by reading off or scanning the raw image data from an image pickup device 110 for pixels that vary more than a specific amount in intensity from their neighboring pixels. The raw image sensor data is the unprocessed brightness data output obtained from the image sensor and which has not gone through any lossy compression or color processing. The image sensor reads analog voltage or current, converts to digital and sends the signal to a host with no further processing or compression. The photosites on the image sensor are used to capture either color or monochrome digital still or video images. The raw image data is sent to the intelligent host over a bus with a data transfer rate which is determined by the bus protocol of the particular bus such as a universal serial bus (USB) or a parallel port.

The raw image sensor data, the location and frequency of occurrence of each defective pixel, and the results of all intermediate computations performed by the computer program are all stored in memory 116. Other algorithms are then used to average the values of an anomalous pixel's neighboring pixels to replace the data from the defective pixel. The corrected data can then be further processed and ultimately displayed on the monitor 120. The process includes video subsampling, meaning that the detection is carried out and repeated at various frame intervals. The video subsampling is carried out on one of every 128 (1/128) frames. Alternately, the video subsampling can be carried out on every 1/64 video frames. And yet in an additional embodiment, the video subsampling is carried out on every 1/(n times X) frames, where n is an integer and X is not equal to 50 or 60. 50 and 60 correspond to 50 Hz and 60 Hz, which are AC lighting frequencies used in the United States and Europe respectively. This way, it is ensured that anomalous raw data pixels are not artifacts of the artificial lighting systems. The use of video subsampling allows for rapid and optimum corrections without the need to scan every frame which would adversely impact the processing speed of the processor and the system. Naturally, no video subsampling is employed when detecting and correcting defective pixels in still images.

A statistical database recording the location and the frequency of occurrence of defective pixels is generated and stored in memory 116 to allow the system to learn and adapt its operation over time. The trends from the statistical database are stored so that truly anomalous pixels can over time be distinguished from false detection of true anomalies in the target image, lighting or other environmentally induced anomalies. The operations logic of the statistical database and the details of the operation of the computer program are described below.

Figure 2:
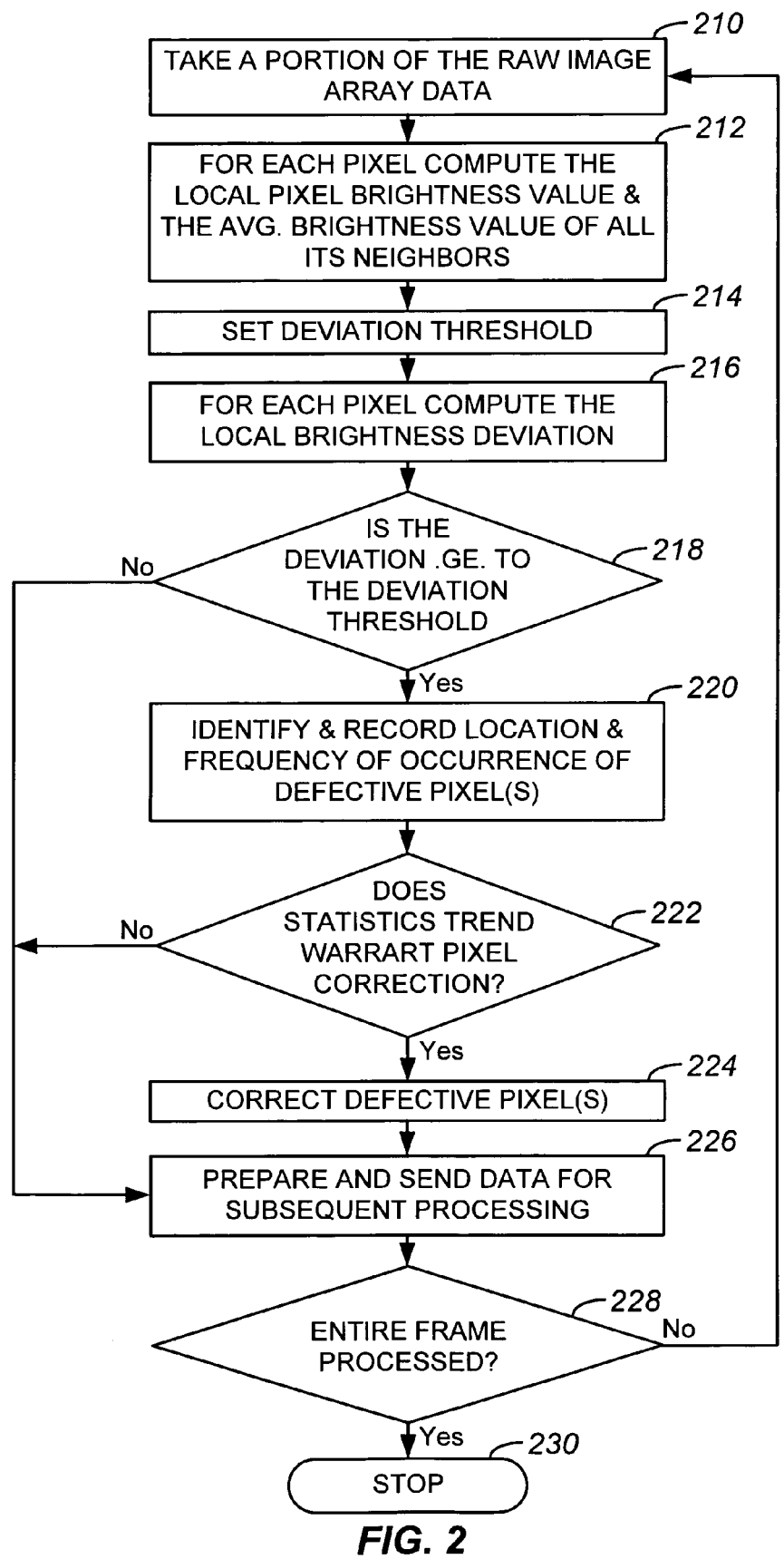
FIG. 2 illustrates a simplified flow chart of a method of detecting and correcting defective pixels according to one embodiment of the present invention.

FIG. 2 illustrates a simplified flow chart describing the functioning of the software program implemented in a system for detecting and correcting defective pixels according to one embodiment of the present invention. The first step in defective pixel detection and correction includes acquiring a portion of a frame of raw image data from an image sensor array, step 210. The raw image data may be data corresponding to a live scene being digitized or it may be data corresponding to a calibration or "black" background image. The "black" background image may be obtained by reducing the integration time of the sensor array or by reducing the gain of the image signal. The raw data from the "black" image can be used to detect over active photosites. The raw data corresponding to the "black" image must also be black, and if any pixel is not, then it corresponds to an overactive photosite. The use of the "black" image can enhance defective pixel detection by removing any brightness deviations that originate from the scene itself.

Although the data from an entire frame can be processed at one time for defective pixel detection and correction, the algorithm begins its function as soon as data from three lines from the image sensor has arrived at the host. Three lines of data from the image sensor array will allow for the processing of data for a pixel and all its surrounding neighbors. Moreover, when the sensor array is being used to capture video images, video subsampling is used so that not every frame of the video captured by the image sensor array is required for the defective pixel detection operation. In a preferred embodiment, defect detection is carried out at predetermined frame intervals as described above and the correction is applied to all video frames. The judicious use of video subsampling allows for the method to be very fast and efficient.

In an alternate embodiment, no video subsampling is used such that the defective pixel detection is carried out on every video frame. The use of video subsampling is a function of the intelligent host's processor speed. If a processor is fast enough to allow detection of anomalous pixels in every frame, then video subsampling is not used. If, on the other hand, the processor is not fast enough to allow video processing at a desired frame rate, then video subsampling is used to ensure data transfer at that desired frame rate. Without video subsampling, anomalous pixel correction is immediate, such that defects are corrected in the very frame in which they are detected. With video subsampling, anomalous pixel correction is delayed until a frame is sampled to detect anomalous pixels. Therefore, the choice of using video subsampling, and the rate of subsampling are a function of the processor speed and a trade off between processor power and the delay before correction.

After data acquisition, for each of the acquired pixels, the local pixel brightness value and also the average brightness value of all its immediately neighboring pixels are computed and stored, step 212. Next, a deviation threshold value is established, step 214. The deviation threshold establishes the acceptable level of variance between a pixel's brightness value and the average brightness value of all its immediately neighboring pixels. Next, for each acquired pixel, a local brightness deviation is computed, step 216. The local brightness deviation is the absolute value of the difference between a pixel's brightness value and the average of the brightness value of all its immediately neighboring pixels.

Next, for each pixel whose data that has been acquired, its local brightness deviation is compared to the deviation threshold, step 218. Any pixel whose local brightness deviation exceeds the threshold deviation value is then flagged as a defective pixel. The physical location and the frequency of occurrence of each defective pixel is then recorded in a statistical database, step 220. The statistical database is then queried, to determine whether the defective pixel's data value should be corrected, step 222. The statistical database, by storing the location and frequency of defective pixels, develops over time trends which confirm which of the defective pixels warranted correction. The logic of the trends from the statistical database initially warrant correction of all flagged defective pixels as a default, and over time warrant pixel correction only if a particular pixel has an occurrence frequency of at least two out of the last four queries.

The defective pixels that have passed through the statistical database filter are corrected next, step 224. In order to correct a defective pixel, the erroneous raw brightness data for a defective pixel is replaced by that pixel's local average brightness value, which is the average brightness value of all its immediately neighboring pixels. Next, the corrected data from the defective pixels as well as data from non-defective pixels is prepared to be sent for subsequent processing, step 226. Subsequent processing may include compression, color processing and encoding to data formats suitable for display. The defective pixel detection and correction is carried out on the raw data from the image sensor array because it is preferred to correct the data before any subsequent processing has occurred since that processing itself can introduce artifacts which are hard to distinguish from artifacts which have been produced as a result of defective photosites.

The software algorithm is intentionally kept very simple so that the processor load and/or the video frame rate is minimally affected. First, the software algorithm is kept simple because it only performs three functions, namely the detection, correction and statistics functions. The statistics routine is kept simple because only position information and frequency of occurrence of anomalous pixels are tracked. Second, the software algorithm is kept simple so as to have a minimal impact on the rate at which data is transferred to the host, so that while a frame is being scanned for defective pixels, subsequent frames are not held up. The maximum impact of the software algorithm is to at worst reduce the video data transfer rate from 10 frames per second (fps) to 9 fps. Third, the software algorithm is kept simple such that the host processor's load is not increased by more 1% when executing the algorithm. The anomalous pixels are detected in one frame and the corrections are later instituted on subsequent frames as they are read off the image sensor.

Therefore, when the system is operating, as raw image data from the image sensor is obtained and sent to be processed on a host, frames are captured for defective pixel detection and correction as described above. Once a defective pixel has been identified and its correction has been warranted by the statistical database, that correction will continue for all subsequent frames until the next query is made to the statistical database. If at that time the initially flagged defective pixel continues to be designated as a defective one, then the corrections will continue as described above. If on the other hand, the statistical database does not warrant the correction of defective pixels, then those pixels will no longer be corrected until the next query to the statistical database is made. The dynamic nature of this system will also allow for corrections of data from photosites that become defective over time due to post-manufacture environmental changes.

The statistical analysis segment of the defect detection and correction algorithm is an optional one. It is aimed at increasing the efficiency of the pixel corrections, so as not to correct anomalies that were not caused by defective photosites, and hence save processing time and load. However, the gains in efficiency must be balanced against the load imposed by the statistical analysis portion itself. In an alternate embodiment not employing the statistical analysis portion, all pixels that get flagged as defective get corrected. As in the choice of using or not using the video subsampling, the decision to employ the statistical analysis portion of the defect detection and correction algorithm depends on a trade off between efficiency and processor power. If the processor is fast enough, then efficiency concerns are not so important. On the other hand, if the processor is not fast enough, then pixel correction efficiency becomes important enough to warrant the implementation of the statistical analysis portion of the defect detection and correction algorithm.

As will be understood by those of skill in the art, the present invention may be embodied in other specific forms without departing from the essential characteristics thereof. For example, the rate of video subsampling could be varied, or not done at all. Alternately, the logic of the optional statistical database could be altered from one of correcting defective pixels as a default to one where defective pixels are corrected only if warranted by the trends from the statistical database. Accordingly, the foregoing disclosure in intended to be illustrative, but not limiting, of the scope of the invention which is set forth in the following claims.

What is claimed is:

1. A method of detecting and correcting defective pixel data in raw data taken from an image sensor of a portable image capture device used to obtain a digitized image, wherein said raw data includes normal pixel data and defective pixel data, said method comprising:
   receiving at an intelligent host a raw data signal for each pixel in said image from said portable image capture device;
   computing for each pixel received from said image sensor a brightness value;
   computing for each pixel received from said image sensor a local brightness value;
   computing for each pixel received from said image sensor a local brightness deviation of said brightness value from said local brightness value;
   comparing, for each pixel received from said image sensor, its local brightness deviation to a deviation threshold and designating pixels having local brightness deviations greater than said deviation threshold as defective pixels;
   recording the location of said defective pixels in a statistical database;
   recording the frequency of occurrence of said defective pixels in said statistical database; and
   correcting the brightness value of said defective pixels, provided said correcting is warranted by trends from said statistical database,
   wherein the computing steps, comparing step, recording steps, and correcting step are performed by the intelligent host,
   wherein said correcting is achieved by replacing said defective pixel's brightness value by said defective pixel's local brightness value,
   wherein said detecting includes video subsampling, wherein using video subsampling said detecting is carried out on video data frames at a rate of one of every n video frames, the n being no less than 32.

2. A method of detecting and correcting defective pixel data in raw data taken from an image sensor of a portable image capture device used to obtain a digitized image, wherein said raw data includes normal pixel data and defective pixel data, said method comprising:
   receiving at an intelligent host a raw data signal for each pixel in said image from said portable image capture device;
   computing for each pixel received from said image sensor a brightness value;
   computing for each pixel received from said image sensor a local brightness value;
   computing for each pixel received from said image sensor a local brightness deviation of said brightness value from said local brightness value;
   comparing, for each pixel received from said image sensor, its local brightness deviation to a deviation threshold and designating pixels having local brightness deviations greater than said deviation threshold as defective pixels;
   recording the location of said defective pixels in a statistical database;
   recording the frequency of occurrence of said defective pixels in said statistical database; and
   correcting the brightness value of said defective pixels, provided said correcting is warranted by trends from said statistical database,
   wherein the computing steps, comparing step, recording steps, and correcting step are performed by the intelligent host,
   performing said detecting and correcting of said defective pixels dynamically and without any operator intervention, wherein said detecting includes video subsampling, wherein using video subsampling said detecting is carried out on video data frames at a rate of one of every n video frames, the n being no less than 32, and wherein said correcting is continuous on every video data frame.

3. A method of detecting and correcting defective pixel data in raw data taken from an image sensor used to obtain a digitized image, wherein said raw data includes normal pixel data and defective pixel data, said method comprising:
   receiving a raw data signal for each pixel in said image;
   computing for each pixel data received from said image sensor a brightness value;
   computing for each pixel data received from said image sensor a local brightness value;
   computing for each pixel data received from said image sensor a local brightness deviation of said brightness value from said local brightness value;
   setting a deviation threshold;
   comparing for each pixel data received from said image sensor, its local brightness deviation to said deviation threshold and designating pixels having local brightness deviations greater than said deviation threshold as defective pixels;
   recording the location of said defective pixels in a statistical database;
   recording the frequency of occurrence of said defective pixels in said statistical database; and
   correcting the brightness value of said defective pixels, provided said correcting is warranted by trends from said statistical database,
   wherein said statistical database, by storing the location and frequency of defective pixels, develops over time trends which confirm which of said defective pixels warrant pixel correction, wherein said trends initially warrant pixel correction as a default and over time warrant pixel correction only if a particular defective pixel has an occurrence frequency of at least two out of four queries.

4. A method of detecting and correcting defective pixel data in raw data taken from an image sensor of a portable image capture device used to obtain a digitized image, wherein said raw data includes normal pixel data and defective pixel data, said method comprising:
   receiving at an intelligent host a raw data signal for each pixel in said image from said portable image capture device;
   computing for each pixel received from said image sensor a brightness value;
   computing for each pixel received from said image sensor a local brightness value;
   computing for each pixel received from said image sensor a local brightness deviation of said brightness value from said local brightness value;
   comparing, for each pixel received from said image sensor, its local brightness deviation to a deviation threshold and designating pixels having local brightness deviations greater than said deviation threshold as defective pixels;

recording the location of said defective pixels in a statistical database;
recording the frequency of occurrence of said defective pixels in said statistical database; and
correcting the brightness value of said defective pixels, provided said correcting is warranted by trends from said statistical database,
wherein the computing steps, comparing step, recording steps, and correcting step are performed by the intelligent host,
wherein said detecting includes video subsampling, wherein using video subsampling said detecting is carried out on video data frames at a rate between one of every 128 video frames and 1 of every 32 video frames, and wherein said correcting is continuous on every video data frame.

5. A method of detecting and correcting defective pixel data in raw data taken from an image sensor of a portable image capture device used to obtain a digitized image, wherein said raw data includes normal pixel data and defective pixel data, said method comprising:
receiving at an intelligent host a raw data signal for each pixel in said image from said portable image capture device;
computing for each pixel received from said image sensor a brightness value;
computing for each pixel received from said image sensor a local brightness value;
computing for each pixel received from said image sensor a local brightness deviation of said brightness value from said local brightness value;
comparing, for each pixel received from said image sensor, its local brightness deviation to a deviation threshold and designating pixels having local brightness deviations greater than said deviation threshold as defective pixels;
recording the location of said defective pixels in a statistical database;
recording the frequency of occurrence of said defective pixels in said statistical database; and
correcting the brightness value of said defective pixels, provided said correcting is warranted by trends from said statistical database,
wherein the computing steps, comparing step, recording steps, and correcting step are performed by the intelligent host,
wherein said detecting includes video subsampling, wherein using video subsampling said detecting is carried out on video data frames at a rate of one of every n times X frames, where n is an integer and where X is not equal to either 50 or 60.

6. A dynamic method requiring no user intervention for detecting and correcting defective pixel data in raw data taken from an image sensor which is part of one of (a) a digital video camera and (b) a digital still camera, used to obtain a digitized image which is sensed by a camera and transmitted over a bus to a PC, wherein said raw data includes normal pixel data and defective pixel data, said method comprising the steps of:
receiving raw data signals for each pixel from said image;
computing for each pixel signal received from said image sensor a brightness value;
computing for each pixel signal received from said image sensor a local brightness value, wherein said local brightness value is the arithmetic average of the brightness values of all pixels immediately neighboring and surrounding said pixel;
computing for each pixel signal received from said image sensor a local brightness deviation of said brightness value from said local brightness value, wherein said local brightness deviation is the absolute value of the difference between said pixel's brightness value and said pixel's local brightness value;
setting a deviation threshold;
comparing for each pixel signal received from said image sensor, its local brightness deviation to said deviation threshold and designating pixels having local brightness deviations greater than said deviation threshold as defective pixels;
recording the location of said defective pixels in a statistical database;
recording the frequency of occurrence of said defective pixels in said statistical database; and
correcting the brightness value of said defective pixels, provided said correcting is warranted by trends from said statistical database, wherein said correcting is achieved by replacing said defective pixel's brightness value by said defective pixel's local brightness value, wherein said statistical database warrants pixel correction if a particular defective pixel has an occurrence frequency of at least two out of four queries; and
wherein said detecting is carried out on video data at a rate of one of (a) between one of every 128 video frames and 1 of every 32 video frames, and (b) one of every n times X frames, where n is an integer and X in not equal to either 50 or 60, and where said correcting is carried out continuously on every video data frame.

7. A system for detecting and correcting defective pixel data in raw data taken from an image sensor used to obtain a digitized image, wherein said raw data includes normal pixel data and defective pixel data, said system comprising:
a portable image capture device including an image sensor to record an image of a scene, said image sensor containing a grid of photosites to convert light shining on said photosites to electrical charges, wherein said electrical charges are converted to a series of analog charges which are then converted to digital signals by an analog to digital converter when said image is read off said sensor and;
an intelligent host configured to receive said digital signals from said image sensor of said portable device, wherein said intelligent host includes a computer program product comprising:
a computer usable medium having computer readable code embodied therein for causing the detection and correction of said defective pixels, said computer program product comprising:
computer readable program code devices configured to cause a computer to compute for each pixel data received from said image sensor a brightness value, said each pixel data received from said portable device by said intelligent host being a raw data signal;
computer readable program code devices configured to cause a computer to compute for each pixel data received from said image sensor a local brightness value;
computer readable program code devices configured to cause a computer to compute for each pixel data received from said image sensor a local brightness deviation of said brightness value from said local brightness value;
computer readable program code devices configured to cause a computer to set a deviation threshold to be used in conjunction with said local brightness deviation;

computer readable program code devices configured to cause a computer to compare for each pixel, its local brightness deviation to said deviation threshold and designate pixels having local brightness deviations greater than said deviation threshold as defective pixels;

computer readable program code devices configured to cause a computer to record the location of said defective pixels in a statistical database;

computer readable program code devices configured to cause a computer to record the frequency of occurrence of said defective pixels in said statistical database; and computer readable program code devices configured to cause a computer to correct the brightness value of said defective pixels, provided the correction is warranted by trends from said statistical database, wherein said statistical database, by storing the location and frequency of defective pixels, develops over time trends which confirm which of said defective pixels are warranted for pixel correction, wherein said trends initially warrant pixel correction as a default and over time warrant pixel correction only if a particular defective pixel has an occurrence frequency of at least two out of four queries.

8. A system for detecting and correcting defective pixel data in raw data taken from an image sensor used to obtain a digitized image, wherein said raw data includes normal pixel data and defective pixel data, said system comprising:

a portable image capture device including an image sensor to record an image of a scene, said image sensor containing a grid of photosites to convert light shining on said photosites to electrical charges, wherein said electrical charges are converted to a series of analog charges which are then converted to digital signals by an analog to digital converter when said image is read off said sensor and;

an intelligent host configured to receive said digital signals from said image sensor of said portable device, wherein said intelligent host includes a computer program product comprising:

a computer usable medium having computer readable code embodied therein for causing the detection and correction of said defective pixels, said computer program product comprising:

computer readable program code devices configured to cause a computer to compute for each pixel data received from said image sensor a brightness value, said each pixel data received from said portable device by said intelligent host being a raw data signal;

computer readable program code devices configured to cause a computer to compute for each pixel data received from said image sensor a local brightness value;

computer readable program code devices configured to cause a computer to compute for each pixel data received from said image sensor a local brightness deviation of said brightness value from said local brightness value;

computer readable program code devices configured to cause a computer to set a deviation threshold to be used in conjunction with said local brightness deviation;

computer readable program code devices configured to cause a computer to compare for each pixel, its local brightness deviation to said deviation threshold and designate pixels having local brightness deviations greater than said deviation threshold as defective pixels;

computer readable program code devices configured to cause a computer to record the location of said defective pixels in a statistical database;

computer readable program code devices configured to cause a computer to record the frequency of occurrence of said defective pixels in said statistical database; and computer readable program code devices configured to cause a computer to correct the brightness value of said defective pixels, provided the correction is warranted by trends from said statistical database, wherein said computer program causes said detecting to be carried out on video data frames at a rate between one of every 128 video frames and 1 of every 32 video frames, and said computer program causes said correcting to be carried out continuously on every video data frame.

9. A system for detecting and correcting defective pixel data in raw data taken from an image sensor used to obtain a digitized image, wherein said raw data includes normal pixel data and defective pixel data, said system comprising:

a portable image capture device including an image sensor to record an image of a scene, said image sensor containing a grid of photosites to convert light shining on said photosites to electrical charges, wherein said electrical charges are converted to a series of analog charges which are then converted to digital signals by an analog to digital converter when said image is read off said sensor and;

an intelligent host configured to receive said digital signals from said image sensor of said portable device, wherein said intelligent host includes a computer program product comprising:

a computer usable medium having computer readable code embodied therein for causing the detection and correction of said defective pixels, said computer program product comprising:

computer readable program code devices configured to cause a computer to compute for each pixel data received from said image sensor a brightness value, said each pixel data received from said portable device by said intelligent host being a raw data signal;

computer readable program code devices configured to cause a computer to compute for each pixel data received from said image sensor a local brightness value;

computer readable program code devices configured to cause a computer to compute for each pixel data received from said image sensor a local brightness deviation of said brightness value from said local brightness value;

computer readable program code devices configured to cause a computer to set a deviation threshold to be used in conjunction with said local brightness deviation;

computer readable program code devices configured to cause a computer to compare for each pixel, its local brightness deviation to said deviation threshold and designate pixels having local brightness deviations greater than said deviation threshold as defective pixels;

computer readable program code devices configured to cause a computer to record the location of said defective pixels in a statistical database;

computer readable program code devices configured to cause a computer to record the frequency of occurrence of said defective pixels in said statistical database; and computer readable program code devices configured to cause a computer to correct the brightness value of said defective pixels, provided the correction is warranted by trends from said statistical database, wherein said computer program causes said detecting to be carried out on video data frames at a rate of one of every n times X frames, where n is an integer, and where X is not equal to either 50 or 60, and said computer program causes said correcting to be carried out continuously on every video data frame.

10. A system for detecting and correcting defective pixel data in raw data taken from an image sensor used to obtain a digitized image, wherein said raw data includes normal pixel data and defective pixel data, said system comprising:

a portable image capture device including an image sensor to record an image of a scene, said image sensor containing a grid of photosites to convert light shining on said photosites to electrical charges, wherein said electrical charges are converted to a series of analog charges which are then converted to digital signals by an analog to digital converter when said image is read off said sensor and;

an intelligent host configured to receive said digital signals from said image sensor of said portable device, wherein said intelligent host includes a computer program product comprising:

a computer usable medium having computer readable code embodied therein for causing the detection and correction of said defective pixels, said computer program product comprising:

computer readable program code devices configured to cause a computer to compute for each pixel data received from said image sensor a brightness value, said each pixel data received from said portable device by said intelligent host being a raw data signal;

computer readable program code devices configured to cause a computer to compute for each pixel data received from said image sensor a local brightness value;

computer readable program code devices configured to cause a computer to compute for each pixel data received from said image sensor a local brightness deviation of said brightness value from said local brightness value;

computer readable program code devices configured to cause a computer to set a deviation threshold to be used in conjunction with said local brightness deviation;

computer readable program code devices configured to cause a computer to compare for each pixel, its local brightness deviation to said deviation threshold and designate pixels having local brightness deviations greater than said deviation threshold as defective pixels;

computer readable program code devices configured to cause a computer to record the location of said defective pixels in a statistical database;

computer readable program code devices configured to cause a computer to record the frequency of occurrence of said defective pixels in said statistical database; and computer readable program code devices configured to cause a computer to correct the brightness value of said defective pixels, provided the correction is warranted by trends from said statistical database, wherein execution of said computer program product does not increase processor load by more than between 1 percent to 80 percent.

11. A system for detecting and correcting defective pixel data in raw data taken from an image sensor used to obtain a digitized image, wherein said raw data includes normal pixel data and defective pixel data, said system comprising:

a portable image capture device including an image sensor to record an image of a scene, said image sensor containing a grid of photosites to convert light shining on said photosites to electrical charges, wherein said electrical charges are converted to a series of analog charges which are then converted to digital signals by an analog to digital converter when said image is read off said sensor and;

an intelligent host configured to receive said digital signals from said image sensor of said portable device, wherein said intelligent host includes a computer program product comprising:

a computer usable medium having computer readable code embodied therein for causing the detection and correction of said defective pixels, said computer program product comprising:

computer readable program code devices configured to cause a computer to compute for each pixel data received from said image sensor a brightness value, said each pixel data received from said portable device by said intelligent host being a raw data signal;

computer readable program code devices configured to cause a computer to compute for each pixel data received from said image sensor a local brightness value;

computer readable program code devices configured to cause a computer to compute for each pixel data received from said image sensor a local brightness deviation of said brightness value from said local brightness value;

computer readable program code devices configured to cause a computer to set a deviation threshold to be used in conjunction with said local brightness deviation;

computer readable program code devices configured to cause a computer to compare for each pixel, its local brightness deviation to said deviation threshold and designate pixels having local brightness deviations greater than said deviation threshold as defective pixels;

computer readable program code devices configured to cause a computer to record the location of said defective pixels in a statistical database;

computer readable program code devices configured to cause a computer to record the frequency of occurrence of said defective pixels in said statistical database; and computer readable program code devices configured to cause a computer to correct the brightness value of said defective pixels, provided the correction is warranted by trends from said statistical database, wherein execution of said computer program product does not reduce video processing by more than 1 frame per second.

* * * * *